United States Patent
Koyama

(10) Patent No.: US 10,836,900 B2
(45) Date of Patent: Nov. 17, 2020

(54) METHOD FOR PRODUCING ALIPHATIC POLYESTER RESIN COMPOSITION

(71) Applicant: KANEKA CORPORATION, Osaka-shi (JP)

(72) Inventor: Ryohei Koyama, Settsu (JP)

(73) Assignee: KANEKA CORPORATION, Osaka-shi (JP)

( * ) Notice: Subject to any disclaimer, the term of this patent is extended or adjusted under 35 U.S.C. 154(b) by 144 days.

(21) Appl. No.: 16/316,731

(22) PCT Filed: Jul. 13, 2017

(86) PCT No.: PCT/JP2017/025530
§ 371 (c)(1),
(2) Date: Jan. 10, 2019

(87) PCT Pub. No.: WO2018/012583
PCT Pub. Date: Jan. 18, 2018

(65) Prior Publication Data
US 2020/0181394 A1 Jun. 11, 2020

(30) Foreign Application Priority Data
Jul. 14, 2016 (JP) ................. 2016-139421

(51) Int. Cl.
*C08L 67/03* (2006.01)
*C08J 3/00* (2006.01)
(Continued)

(52) U.S. Cl.
CPC .............. *C08L 67/03* (2013.01); *C08J 3/005* (2013.01); *C08K 3/36* (2013.01); *C08K 5/109* (2013.01); *C08K 5/11* (2013.01); *C08K 5/1535* (2013.01)

(58) Field of Classification Search
CPC ............ C08L 67/02; C08L 67/04; C08J 3/226
See application file for complete search history.

(56) References Cited

U.S. PATENT DOCUMENTS 6,462,105 B1 * 10/2002 Kuroki ..................... C08K 3/36
523/351
2012/0095136 A1 * 4/2012 Ammann .................. C09C 3/10
524/13
(Continued)

FOREIGN PATENT DOCUMENTS

JP       2009-221337 A    10/2009
WO    WO 2014/054278 A1    4/2014

OTHER PUBLICATIONS

Machine Translation of JP 2009221337 (Year: 2020).*
International Search Report dated Oct. 10, 2017 in PCT/JP2017/025530 filed Jul. 13, 2017.

*Primary Examiner* — Michael M Dollinger
(74) *Attorney, Agent, or Firm* — Oblon, McClelland, Msier & Neustadt, L.L.P.

(57) ABSTRACT

A method for producing an aliphatic polyester resin composition containing 100 parts by weight of an aliphatic polyester (A), 5 to 23 parts by weight of silica (B) and 8 to 23 parts by weight of a dispersion aid (C), the method including: a first step of mixing 20 to 50% by weight of the aliphatic polyester (A) based on the total amount of the aliphatic polyester (A) constituting the composition, and the silica (B); a second step of mixing the dispersion aid (C) with the mixture obtained in the first step; a third step of mixing the mixture obtained in the second step with the remaining 80 to 50% by weight of aliphatic polyester (A) based on the total amount of the aliphatic polyester (A) constituting the composition; and a step of melting and kneading the mixture obtained in the third step.

18 Claims, 1 Drawing Sheet

(51) Int. Cl.
    *C08K 3/36*     (2006.01)
    *C08K 5/109*     (2006.01)
    *C08K 5/11*     (2006.01)
    *C08K 5/1535*     (2006.01)

(56) References Cited

U.S. PATENT DOCUMENTS

| | | | |
|---|---|---|---|
| 2012/0184672 A1* | 7/2012 | Riscanu | B29C 51/002 |
| | | | 524/601 |
| 2012/0259047 A1* | 10/2012 | Akutsu | C08K 5/521 |
| | | | 524/145 |
| 2015/0232660 A1 | 8/2015 | Okura et al. | |
| 2015/0291761 A1* | 10/2015 | Iacobucci | C08K 5/14 |
| | | | 521/53 |
| 2015/0329682 A1* | 11/2015 | Iacobucci | C08J 9/00 |
| | | | 521/54 |

* cited by examiner

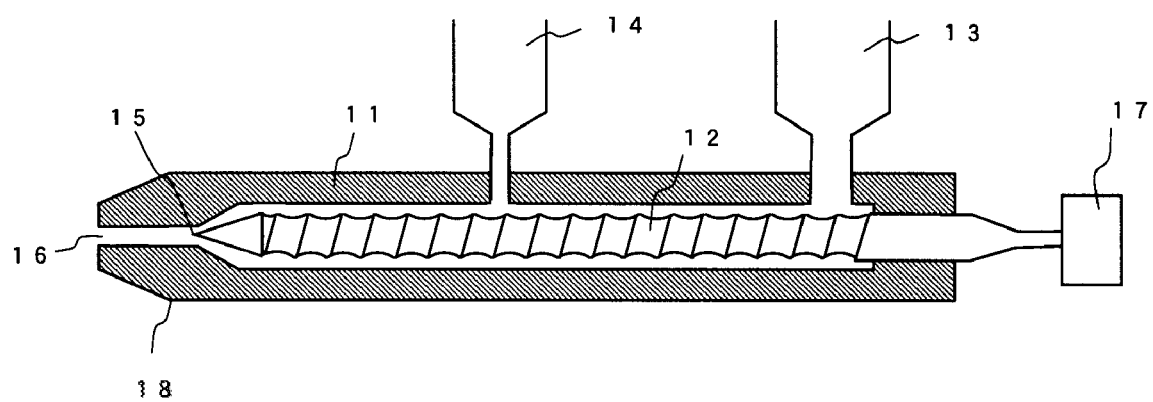

METHOD FOR PRODUCING ALIPHATIC POLYESTER RESIN COMPOSITION

TECHNICAL FIELD

The present invention relates to a method for producing an aliphatic polyester resin composition, and particularly to a method for producing an aliphatic polyester resin composition usable for production of a sheet or film which has high tear strength as well as a favorable appearance for being applied as various industrial materials.

BACKGROUND ART

In recent years, there has been the problem that plastic waste gives a large load to the global environment through impacts on ecosystems, generation of harmful gases during combustion, global warming caused by a large amount of combustion heat, and the like, and as a solution for the problem, biodegradable plastics have been actively developed.

In particular, when biodegradable plastics are derived from plants, carbon dioxide generated in combustion of the biodegradable plastics originally exists in the air, and therefore the amount of carbon dioxide in the atmosphere does not increase. This is referred to as "carbon-neutral", and emphasized under the Kyoto Protocol which specifies the carbon dioxide reduction target value, and active use of the "carbon-neutral" is desired.

Recently, from the viewpoint of biodegradability and "carbon-neutral", aliphatic polyester-based resins have attracted attention as plant-derived plastics, and particularly, polyhydroxyalkanoate (hereinafter, sometimes referred to as PHA)-based resins, and poly(3-hydroxybutyrate) homopolymer resin (hereinafter, sometimes referred to as P3HB), poly(3-hydroxybutyrate-co-3-hydroxyvalerate) copolymer resin (hereinafter, referred to as P3HB3HV), poly(3-hydroxybutyrate-co-3-hydroxyhexanoate) copolymer resin (hereinafter, sometimes referred to as P3HB3HH), poly(3-hydroxybutyrate-co-4-hydroxybutyrate) copolymer resin (hereinafter, sometimes referred to as P3HB4HB), among the PHA-based resins, polylactic acid (hereinafter, sometimes referred to as PLA) and the like, among the PHA-based resins, have attracted attention.

In fact, however, a film or sheet composed of an aliphatic polyester or a resin composition containing the aliphatic polyester has insufficient tear strength and is poor in practical properties, and various studies have been conducted for improving the properties.

Patent Literature 1 discloses a polyester resin composition, the tear strength of which is improved by a formulation in which an aliphatic polyester, polybutylene adipate terephthalate (PBAT), a hydrophilic silica and a plasticizer are blended, and Patent Literature 1 also discloses a method for producing the composition, the method including a first step of melting and kneading an aliphatic polyester, a hydrophilic silica and a plasticizer, and a second step of adding PBAT thereto and melting and kneading the mixture.

Patent Literature 2 discloses a technique for molding a resin composition containing an aliphatic polyester-based resin, an aromatic-aliphatic polyester-based resin and inorganic particles for the purpose of obtaining high tear strength and easy biodegradability. However, when a resin composition obtained by the technique is used for shopping bags or garbage bags which are used for housing heavy articles or articles of various shapes, a film to be used for agricultural materials or the like, tear strength is so extremely low that practicality cannot be secured at all. In addition, for example, when inorganic particles which have a low bulk density and easily undergo secondary aggregation are used, a problem may arise in dispersibility even when processing is performed by the method disclosed in Patent Literature 2.

CITATION LIST

Patent Literature

PTL 1: WO 2014/054278
PTL 2: JP-A No. 2009-221337

SUMMARY OF INVENTION

Technical Problem

According to the production method described in Patent Literature 1, it is possible to obtain a resin composition excellent in transparency, moldability and mechanical properties, and also excellent in biodegradability. However, as a result of continuously examining the method by the present inventor, it has been found that the method has room for further improvement from the viewpoint of improving the dispersibility of silica and improving the tear strength of the resin composition.

Thus, an object of the present invention is to provide a production method in which melting and kneading is performed to obtain a resin composition containing at least an aliphatic polyester, silica and a dispersion aid, the method being capable of stably ensuring favorable dispersibility of silica and improving the tear strength of the resin composition.

Solution to Problem

The present inventor has extensively conducted studies for achieving the above-described object, and resultantly found a production method capable of stably ensuring favorable dispersibility of silica and improving the tear strength of a resin composition by mixing an aliphatic polyester, silica and a dispersion aid in an appropriate blending amount and order before melting and kneading, leading to completion of the present invention.

Specifically, the present invention provides, for example, the following:

[1]

A method for producing an aliphatic polyester resin composition containing 100 parts by weight of an aliphatic polyester (A), 5 to 23 parts by weight of silica (B) and 8 to 23 parts by weight of a dispersion aid (C), the method including:

a first step of mixing the aliphatic polyester (A) in an amount of 20 to 50% by weight based on a total amount of the aliphatic polyester (A) constituting the composition, and the silica (B);

a second step of mixing the dispersion aid (C) with a mixture obtained in the first step;

a third step of mixing a mixture obtained in the second step with the aliphatic polyester (A) remaining in an amount of 80 to 50% by weight based on the total amount of the aliphatic polyester (A) constituting the composition; and a step of melting and kneading a mixture obtained in the third step.

[2]

A method for producing an aliphatic polyester resin composition containing 100 parts by weight of an aliphatic polyester (A), 5 to 23 parts by weight of silica (B) and 8 to 23 parts by weight of a dispersion aid (C), the method including:

a first step of mixing the aliphatic polyester (A) in an amount of 20 to 50% by weight based on a total amount of the aliphatic polyester (A) constituting the composition, and the silica (B);

a second step of mixing the dispersion aid (C) with a mixture obtained in the first step;

a third step of mixing a mixture obtained in the second step with a part of the aliphatic polyester (A) remaining in an amount of 80 to 50% by weight based on the total amount of the aliphatic polyester (A) constituting the composition; and a step of melting and kneading a mixture obtained in the third step while sequentially adding the remaining aliphatic polyester (A).

[3]

The method for producing an aliphatic polyester resin composition according to [1] or [2], including a step of mixing an aliphatic-aromatic polyester (D) after the third step.

[4]

The method for producing an aliphatic polyester resin composition according to [3], in which the mixing of the aliphatic-aromatic polyester (D) is performed by melting and kneading.

[5]

The method for producing an aliphatic polyester resin composition according to [4], in which the mixing of the aliphatic-aromatic polyester (D) is performed by melting and kneading the aliphatic-aromatic polyester (D) with a melted and kneaded product of the aliphatic polyester (A), the silica (B) and the dispersion aid (C).

[6]

The method for producing an aliphatic polyester resin composition according to any one of [1] to [5], in which the silica (B) mixed in the first step is silica that has an adsorbed moisture content of 0.5% by weight or more and 7% by weight or less and that is volatilized at 160° C.

[7]

The method for producing an aliphatic polyester resin composition according to any one of [1] to [6], in which the dispersion aid (C) is at least one selected from the group consisting of a glycerin ester compound, an adipic acid ester compound, a polyether ester compound and an isosorbide ester compound.

[8]

The method for producing an aliphatic polyester resin composition according to any one of [1] to [7], in which the aliphatic polyester resin composition is a molded article.

Advantageous Effects of Invention

According to the present invention, it is possible to provide a production method capable of favorably dispersing silica (B) stably in an aliphatic polyester (A) and/or an aliphatic-aromatic polyester (D) (e.g., polybutylene adipate terephthalate (PBAT) or polybutylene succinate terephthalate (PBST)), which can be further added, in an aliphatic polyester resin composition even when silica having a small particle size and bulk density is used, and further improving the tear strength of the resin composition.

BRIEF DESCRIPTION OF DRAWING

FIG. 1 is a sectional view schematically showing one example of a twin-screw extruder (melting/kneading machine) used in examples and comparative examples of the present invention.

DESCRIPTION OF EMBODIMENTS

A method for producing an aliphatic polyester resin composition according to the present invention is a method for producing an aliphatic polyester resin composition (sometimes referred to as a "aliphatic polyester resin composition according to the present invention") containing an aliphatic polyester (A), silica (B) and a dispersion aid (C) as essential components, in which the amount of the aliphatic polyester (A) is 100 parts, the amount of the silica (B) is 5 to 23 parts by weight, and the amount of the dispersion aid (C) is 8 to 23 parts by weight. The aliphatic polyester resin composition according to the present invention may further contain other components such as an aliphatic-aromatic polyester (D).

(Aliphatic Polyester)

Examples of the aliphatic polyester (A) for use in the present invention include polyhydroxyalkanoate (PHA) produced from microorganisms (microbiologically produced PHA) and PLA.

In the present invention, the PHA is an aliphatic polyester resin including a repeating unit represented by the general formula: [—CHR—CH$_2$—CO—O—].

Preferably, the PHA includes a repeating unit represented by the formula (1): [—CHR—CH$_2$—CO—O—](where R is an alkyl group represented by C$_n$H$_{2n+1}$, and n is an integer of 1 or more and 15 or less).

The microorganism that produces PHA is not particularly limited as long as it is a microorganism capable of producing PHA. For example, as a bacterium producing poly(3-hydroxybutyrate) (hereinafter, sometimes abbreviated as "PHB"), *Bacillus megaterium* was discovered first in 1925. In addition, natural microorganisms such as *Cupriavidus necator* (former systematic name: *Alcaligenes eutrophus* and *Ralstonia eutropha*) and *Alcaligenes latus* are known, and in these microorganisms, PHB is accumulated in bacterial cells.

In addition, as bacteria producing a copolymer of hydroxybutyrate and other hydroxyalkanoates, *Aeromonas caviae* as a bacterium producing poly(3-hydroxybutyrate-co-3-hydroxyvalerate) (hereinafter, sometimes abbreviated as "PHBV") and poly(3-hydroxybutyrate-co-3-hydroxyhexanoate (hereinafter, sometimes abbreviated as "PHBH"), *Alcaligenes eutrophus* as a bacterium producing poly(3-hydroxybutyrate-co-4-hydroxybutyrate), and the like are known. In particular, for PHBH, an *Alcaligenes eutrophus* AC32 strain (*Alcaligenes eutrophus* AC32, FERM BP-6038) (T. Fukui, Y. Doi, J. Bateriol., 179, p. 4821-4830 (1997)) in which a gene of a PHA synthase group is introduced, or the like is more preferable because productivity of PHBH is improved, and microbial bacterial cells with PHBH accumulated in bacterial cells by culturing the microorganism under appropriate conditions are used. In addition to the above-described microorganisms, genetically modified microorganisms in which various PHA synthesis-related genes are introduced according to PHA to be produced may be used, and culture conditions including the type of substrate may be optimized.

The molecular weight of the PHA for use in the present invention is not particularly limited as long as it exhibits substantially sufficient physical properties in an intended use. When the molecular weight is low, the strength of the resulting molded product is decreased. Conversely, when the molecular weight is high, processability is deteriorated, so that molding is difficult to be performed. In view of these circumstances, the PHA for use in the present invention has a weight average molecular weight in a range of preferably 50,000 to 3,000,000, and more preferably 100,000 to 1,500,000.

As a method for measuring the weight average molecular weight, the molecular weight can be determined using gel permeation chromatography (GPC) ("Shodex GPC-101" manufactured by Showa Denko K.K.), polystyrene gel ("Shodex K-804" manufactured by Showa Denko K.K.) as a column, and chloroform as a mobile phase, and determined in terms of polystyrene. Here, the calibration curve is prepared using polystyrene having weight average molecular weights of 31,400, 197,000, 668,000 and 1,920,000. As a column in the GPC, a column suitable for measuring the molecular weight may be used.

Examples of the PHA usable in the present invention include PHB [poly(3-hydroxybutyrate), poly(3-hydroxybutyric acid)], PHBH [poly(3-hydroxybutyrate-co-3-hydroxyhexanoate), poly(3-hydroxybutyric acid-co-3-hydroxyhexanoic acid)], PHBV [poly(3-hydroxybutyrate-co-3-hydroxyvalerate), poly(3-hydroxybutyric acid-co-3-hydroxyvaleric acid)], P3HB3HV3HH [poly(3-hydroxybutyrate-co-3-hydroxyvalerate-co-3-hydroxyhexanoate), poly(3-hydroxybutyric acid-co-3-hydroxyvaleric acid-co-3-hydroxyhexanoic acid)], P3HB4HB [poly(3-hydroxybutyrate-co-4-hydroxybutyrate), poly(3-hydroxybutyric acid-co-4-hydroxybutyric acid)], poly(3-hydroxybutyrate-co-3-hydroxyoctanoate) and poly(3-hydroxybutyrate-co-3-hydroxyoctanodecaate). Among these, PHB, PHBH, PHBV, P3HB3HV3HH and P3HB4HB are preferable because they are easily produced on an industrial scale.

From the viewpoint of the balance between flexibility and strength, the composition ratio of the repeating unit of the PHA is preferably 80 mol % to 99 mol %, more preferably 85 mol % to 97 mol % in terms of the composition ratio of 3-hydroxybutyrate (3HB). When the composition ratio of 3-hydroxybutyrate (3HB) is less than 80 mol %, rigidity tends to be insufficient, and when the composition ratio of 3-hydroxybutyrate (3HB) is more than 99 mol %, flexibility tends to be insufficient. The composition ratio of each component which is a repeating unit in the copolymer resin of the PHA can be measured by gas chromatography or the like (see, for example, WO 2014/020838).

For the aliphatic polyester (A) in the present invention, it is preferable that the aliphatic polyester (A) to be used in the first to third steps is in the form of particles (e.g., powder) and has a small particle size for improving the feed property of the silica (B) being finely divided that has a low bulk density and poor feed property and for causing the dispersion aid (C) to effectively function for dispersion of the silica (B). Specifically, the aliphatic polyester (A) has an average particle size (cumulative 50% particle size measured by a particle size distribution meter (Microtrack measuring apparatus)) of preferably 100 to 700 µm, more preferably 200 µm or more, still more preferably 280 µm or more, and more preferably 600 µm or less, still more preferably 500 µm or less. When the average particle size is smaller than 100 µm, productivity may be deteriorated because of poor feed property and poor handling characteristics. On the other hand, when the average particle size is more than 700 µm, there is a large difference in particle size between the aliphatic polyester (A) and the silica (B), it is thus difficult to ensure sufficient mixing, and the mixture of the aliphatic polyester (A) and the silica (B) is still bulky and has a poor feed property, so that a problem may arise in productivity, or the dispersion aid (C) may locally excessively adhere to the silica (B), leading to aggregation of the silica (B).

The content of the aliphatic polyester (A) in the aliphatic polyester resin composition according to the present invention is preferably 10 to 90% by weight, more preferably 25 to 80% by weight, still more preferably 35 to 80% by weight based on the total amount (100% by weight) of the resin composition. When the content is 10% by weight or more, it tends to be possible to effectively develop biodegradability, or secure productivity and openability (anti-blocking property) when tackiness that is a disadvantage of aliphatic-aromatic polyester is suppressed and a film or the like is molded. On the other hand, when the content is 90% by weight or less, the influence of a low crystallization rate that is a disadvantage of aliphatic polyester tends to be suppressed, leading to improvement of productivity. In the aliphatic polyester resin composition according to the present invention, one type of the aliphatic polyester (A) may be used singly, or two or more types of the aliphatic polyester (A) may be used in combination.

(Silica)

The type of the silica (B) for use in the present invention is not particularly limited, but synthetic amorphous silica that is produced by a dry method or a wet method is preferable from the viewpoint of versatility. Also, silica subjected to either hydrophobization treatment or non-hydrophobization treatment can be used, and one type of silica can be used singly, or two or more types of silica can be used in combination.

The blending amount (total blending amount) of the silica (B) in the present invention is 5 to 23 parts by weight based on 100 parts by weight of the total amount of the aliphatic polyester (A) blended in the present invention. When the blending amount of the silica (B) is less than 5 parts by weight, it may be impossible to develop a sufficient improvement effect for mechanical properties such as tear strength at the time of compounding the aliphatic-aromatic polyester (D) such as polybutylene adipate terephthalate (PBAT) or polybutylene succinate terephthalate (PBST). In addition, when the blending amount of the silica (B) is more than 23 parts by weight, it may be difficult to favorably disperse the silica (B). The blending amount of the silica (B) is preferably 6 parts by weight or more, more preferably 8 parts by weight or more, and preferably 23 parts by weight or less, more preferably 20 parts by weight or less, still more preferably 15 parts by weight or less.

As the silica (B) to be mixed in the first step in the present invention, silica having an adsorbed moisture content of 0.5% by weight or more and 7% by weight or less is preferable. The adsorbed moisture content is more preferably 1% by weight or more and 6% by weight or less, still more preferably 2% by weight or more and 5% by weight or less, especially preferably 2% by weight or more and 4% by weight or less. The adsorbed moisture content can be measured as an amount of adsorbed moisture volatilized at 160° C. by using, for example, an electromagnetic balance MX-50 manufactured by Kensei Co., Ltd. When the adsorbed moisture content is more than 7% by weight, the silica (B) may be hardly dispersed due to the cohesive force of moisture adsorbed to the surface of the silica (B) or between particles, and thus form fish eyes during molding of a film, resulting in poor appearance. Conversely, when the adsorbed moisture content is less than 0.5% by weight, a slight amount of moisture remaining between particles forms a crosslinked liquid film, and produces a large bonding force by surface tension, so that it tends to be extremely difficult to distribute and disperse the silica (B).

In addition, the average primary particle size of the silica (B) for use in the present invention is not particularly limited as long as the tear strength of the film or sheet can be improved, appearance defects such as fish eyes are hardly generated, and the transparency is not considerably impaired, but the silica (B) has an average primary particle size of preferably 0.001 to 0.1 more preferably 0.005 to 0.05 μm from the viewpoint of easily obtaining the effect of improving mechanical properties such as tear strength and exhibiting excellent transparency. The average primary particle size is determined by calculation from a specific surface area obtained by the BET method.

(Dispersion Aid)

The dispersion aid (C) for use in the present invention is, for example, an ester compound, and more specific examples thereof include glycerin ester compounds, adipic acid ester compounds, polyether ester compounds, phthalic acid ester compounds, isosorbide ester compounds and polycaprolactone compounds. Among them, glycerin ester compounds such as glycerin diacetomonolaurate, glycerin diacetomonocaprylate and glycerin diacetomonodecanoate; adipic acid ester compounds such as diethylhexyl adipate, dioctyl adipate and diisononyl adipate; and polyether ester compounds such as polyethylene glycol dibenzoate, polyethylene glycol dicaprylate and polyethylene glycol diisostearate are preferable because they are excellent in affinity with resin components and hardly cause bleeding, and further, those containing a large amount of biomass-derived components are especially preferable because the biomass degree of the whole composition can be increased. Examples of the dispersion aid include RIKEMAL (registered trademark) PL series from Riken Vitamin Co., Ltd., and Polysorb series from ROQUETTE. One dispersion aid can be used singly, or two or more dispersion aids can be used in combination.

The blending amount (total blending amount) of the dispersion aid (C) in the present invention is 8 to 23 parts by weight based on 100 parts by weight of the total amount of the aliphatic polyester (A) blended in the present invention. When the blending amount of the dispersion aid (C) is less than 8 parts by weight, it may be impossible to sufficiently exhibit a function as a dispersion aid for the silica (B), or it may be impossible to develop a sufficient improvement effect for mechanical properties such as tear strength at the time of compounding the aliphatic-aromatic polyester (D) such as polybutylene adipate terephthalate (PBAT) or polybutylene succinate terephthalate (PBST). On the other hand, when the blending amount of the dispersion aid (C) is more than 23 parts by weight, bleed-out may occur. The blending amount of the dispersion aid (C) is preferably 13 parts by weight or more, more preferably 15 parts by weight or more, and preferably 22 parts by weight or less, more preferably 21 parts by weight or less.

(Aliphatic-Aromatic Polyester)

Examples of the aliphatic-aromatic polyester (D) for use in the present invention include polybutylene adipate terephthalate (PBAT), polybutylene sebacate terephthalate, polybutylene azelate terephthalate and polybutylene succinate terephthalate (PBST). The polybutylene adipate terephthalate (PBAT) refers to a random copolymer of 1,4-butanediol, adipic acid and terephthalic acid, and in particular, PBAT is preferable which is obtained by reaction of (a) a mixture mainly including 35 to 95 mol % of adipic acid or an ester forming derivative thereof or a mixture thereof and 5 to 65 mol % of terephthalic acid or an ester forming derivative thereof, or a mixture thereof (the sum of these molar amounts (mol %) is 100 mol %) with (b) a mixture containing butanediol (the molar ratio of (a) and (b) is 0.4:1 to 1.5 to 1) as described in JP-T No. 10-508640. Examples of the commercially available product of PBAT include "Ecoflex F blend C 1200" (registered trademark) manufactured by BASF SE. Examples of the polybutylene succinate terephthalate (PBST) include those in which a part of the adipic acid or ester forming derivative thereof in the PBAT is replaced by sebacic acid or an ester forming derivative thereof and examples of the commercially available product of PBST include "Ecoflex FS blend B 1100" (registered trademark) manufactured by BASF SE. In addition, one type of the aliphatic-aromatic polyester (D) can be used singly, or two or more types of the aliphatic-aromatic polyester (D) can be used in combination. In the present invention, mechanical properties such as tear strength can be further improved by compounding the aliphatic-aromatic polyester (D) and the aliphatic polyester (A).

The content (blending amount) of the aliphatic-aromatic polyester (D) in the aliphatic polyester resin composition according to the present invention is not particularly limited, but is preferably 10 to 900 parts by weight, more preferably 25 to 400 parts by weight, still more preferably 40 to 250 parts by weight based on 100 parts by weight of the aliphatic polyester (A). When the content of the aliphatic-aromatic polyester (D) is 10 parts by weight or more, the melt tension of the whole resin composition tends to be increased, leading to improvement of moldability and productivity. On the other hand, when the content of the aliphatic-aromatic polyester (D) is 900 parts by weight or less, tackiness as a disadvantage of the aliphatic-aromatic polyester (D) tends to be suppressed, leading to improvement of productivity and development of efficient biodegradability.

The aliphatic polyester resin composition according to the present invention may contain an organic or inorganic filler and the like as long as the effect of the present invention is not hindered. Among the fillers, for example, woody materials such as wood chips, wood flour and sawdust, and nature-derived materials such as rice husks, rice flour, starch, corn starch, rice straw, wheat straw and natural rubber are preferable. One of these materials can be used singly, or two or more of these materials can be used in combination. The blending amount of the organic or inorganic filler can be appropriately set.

In addition, one or more of fillers other than silica, colorants such as pigments and dyes, odor absorbing agents such as activated carbon and zeolite, flavors such as vanillin and dextrin, oxidation inhibitors, antioxidants, weather resistance improvers, ultraviolet absorbers, lubricants, mold release agents, water repellents, antibacterial agents, sliding improvers, and other additives, which are used as normal additives, may be added to the aliphatic polyester resin composition according to the present invention as long as the effect of the present invention is not hindered. The blending amount of the additive can be appropriately set.

The method for producing an aliphatic polyester resin composition according to the present invention includes the following first step, second step, third step and melting and kneading step as essential steps. The first step, second step and third step are steps for obtaining a mixture to be subjected to the melting and kneading step, and "mixing" in these steps is normally performed at a temperature lower than the temperature at which the aliphatic polyester (A) is melted. That is, the "mixing" means mixing in a non-melted state. When a part of the remaining aliphatic polyester (A) is added in the third step, melting and kneading may be performed while the remaining aliphatic polyester (A) is sequentially added in the subsequent melting and kneading step.

First Step: mixing the aliphatic polyester (A) in an amount of 20 to 50% by weight based on the total amount (100% by weight) of the aliphatic polyester (A) constituting the aliphatic polyester resin composition according to the present invention, and the silica (B).

Second step: mixing the dispersion aid (C) with the mixture obtained in the first step.

Third step: mixing the mixture obtained in the second step with a part or all of the aliphatic polyester (A) remaining in an amount of 80 to 50% by weight based on the total amount of the aliphatic polyester (A) constituting the aliphatic polyester resin composition.

Melting and kneading step: melting and kneading the mixture obtained in the third step.

(Method for Mixing Materials Before Melting and Kneading: First to Third Steps)

In the first to third steps of mixing the aliphatic polyester (A), the silica (B) and the dispersion aid (C) before the melting and kneading step in the method for producing an aliphatic polyester resin composition according to the present invention, the amount of the aliphatic polyester (A) mixed in the first step is 20 to 50% by weight based on the total amount (100% by weight) of the aliphatic polyester (A) contained in the aliphatic polyester resin composition according to the present invention. When the amount of the aliphatic polyester (A) mixed in the first step is less than 20% by weight, the silica (B) is not sufficiently filled into gaps of the aliphatic polyester (A) (which is normally in the form of powder) in mixing, the volume reduction of the raw material is thus insufficient, and the silica (B) has a low bulk density and hence a poor feed property, so that productivity is still low, or the probability of contact between the dispersion aid (C) added in the second step and the silica (B) is increased, so that the silica (B) is aggregated, leading to deterioration of the dispersibility of the silica (B). Conversely, when the amount of the aliphatic polyester (A) mixed in the first step is more than 50% by weight, there is the possibility that the probability of contact between the dispersion aid (C) added in the second step and the aliphatic polyester (A) is increased, so that wetting occurs, leading to deterioration of the function of the dispersion aid (C) as a dispersion aid for the silica (B). In addition, as described above, the amount of the aliphatic polyester (A) added (mixed) in the third step may be the total of the remaining aliphatic polyester (A) mixed in the first step, or a part of the remaining aliphatic polyester (A). When it is a part of the remaining aliphatic polyester (A), the total of the remaining aliphatic polyester (A) is added during the subsequent melting and kneading step. In this way, the discharge amount can be increased to improve productivity.

(Melting and Kneading Method; Melting and Kneading Step)

In the melting and kneading step of the method for producing an aliphatic polyester resin composition according to the present invention, a known kneading machine such as a single-screw extruder, a twin-screw extruder, a planetary roller extruder, a Banbury mixer or the like can be used. Among them, a twin-screw extruder is preferable from the viewpoint of versatility and ease of controlling the distribution/dispersion and shearing of the silica (B). In addition, as setting conditions of the melting and kneading machine, the cylinder set temperature is preferably 180° C. or lower because the thermal decomposition of the aliphatic polyester (A) can be suppressed.

(Side Feed)

When a part of the aliphatic polyester (A) is added during the melting and kneading step as described above, for example, a method is employed in which the aliphatic polyester (A) is side-fed in the middle of an extruder. By side-feeding the aliphatic polyester (A), the discharge amount can be increased, and therefore productivity can be improved. The amount of the aliphatic polyester (A) to be side-fed is preferably 30 to 50% by weight based on the total amount of the aliphatic polyester (A) contained in the aliphatic polyester resin composition according to the present invention. In addition, the position at which the aliphatic polyester (A) is side-fed is preferably a position of 55 to 65% from the upstream side where the total length of the screw is 100%.

(Compounding (Mixing) of Aliphatic-Aromatic Polyester)

In the aliphatic polyester resin composition according to the present invention, the aliphatic-aromatic polyester (D) may be compounded during or after production of the aliphatic polyester resin composition. That is, the method for producing an aliphatic polyester resin composition according to the present invention may include a step of mixing the aliphatic-aromatic polyester (D) in addition to the essential steps described above. This step is normally carried out after the third step. Mixing of the aliphatic-aromatic polyester (D) may be performed by melting and kneading or a process other than melting and kneading (e.g., dry blending). More specifically, as a method for compounding (mixing) the aliphatic-aromatic polyester (D), the aliphatic-aromatic polyester (D) may be supplied by another feeder at the same position as that of a base hopper from which the mixture of the aliphatic polyester (A), the silica (B) and the dispersion aid (C) is put in the extruder, followed by performing melting and kneading, or the aliphatic-aromatic polyester (D) may be side-fed in the middle of the extruder, followed by performing melting and kneading. Alternatively, after the melting and kneading step is carried out to produce an aliphatic polyester resin composition containing the aliphatic polyester (A), the silica (B) and the dispersion aid (C), the solid (e.g., powder-shaped or pellet-shaped) composition may be dry-blended with the aliphatic-aromatic polyester (D), followed by performing second melting and kneading. In particular, it is preferable that mixing of the aliphatic-aromatic polyester (D) is performed by melting and kneading (i.e., performed in the above-mentioned melting and kneading step) from the viewpoint of productivity, and particularly, it is more preferable that the aliphatic-aromatic polyester (D) is side-fed in the middle of the extruder, and melted and kneaded with a melted and kneaded product containing the aliphatic polyester (A), the silica (B) and the dispersion aid (C).

The aliphatic polyester resin composition obtained by the method for producing an aliphatic polyester resin composition according to the present invention may be subjected to molding and processing singly, or after being compounded with various resins or multilayered with various resins. For example, as a molding and processing method in processing of the composition into a film or sheet, a known method such as an inflation method or a T-die extrusion method can be used. Specific conditions may be appropriately set, and for example, in the inflation method, it is preferable that before inflation molding, the composition is dried until the water content of the pellet is 500 ppm or less, the cylinder set temperature is 100 to 160° C., and the adapter and die set temperatures are 130 to 160° C.

The aliphatic polyester resin composition according to the present invention does not cause the problem of a poor appearance resulting from poor dispersion of silica when processed into a film or sheet, and in particular when the composition is compounded with PBAT or PBST, higher tear strength can be exhibited.

The thickness of the film or sheet is not strictly specified, but generally, the film has a thickness of about 1 to 100 μm, and the sheet has a thickness of more than 100 μm and about 2 mm or less.

The film or sheet according to the present invention can be suitably used in the fields of agriculture, fishery, forestry, horticulture, medicine, sanitary goods, food industry, clothing, non-clothing, packaging, automobiles, building materials and so on. For example, the film or sheet is used for multi-films for agriculture, fumigation sheets for forestry, binding tapes including flat yarns and the like, root winding films for garden plants, back sheets of diapers, sheets for packaging, shopping bags, garbage bags, draining bags and other compost bags.

The method for producing an aliphatic polyester resin composition according to the present invention may include a step of molding and processing the aliphatic polyester resin composition. The molding and processing step may be carried out continuously to the above-described melting and kneading step, or carried out discontinuously. Examples of the molding and processing method include the above-described known methods. When the method for producing an aliphatic polyester resin composition according to the present invention includes the molding and processing step, an aliphatic polyester resin composition molded and processed by the production method (i.e., molded article) is obtained. The molded article is not particularly limited, and examples thereof include films and sheets as described above.

EXAMPLES

Hereinafter, the present invention will be described in more detail by way of examples, but the present invention is not limited to the examples.

[Aliphatic Polyester]

An aliphatic polyester A-1 used in the examples is PHBH which is prepared in accordance with the method described in WO 2013/147139 and has a 3-hydroxyhexanoate (3HH) content of 11.2 mol %. The PHBH had a weight average molecular weight of 570,000 as measured by GPC, and an average particle size of 330 μm. In the following examples and comparative examples, the following raw materials were used.

A-2: EM 5400 F [P3HB4HB] (manufactured by Ecomann Company), average particle size: 299 μm

[Silica]

B-1: Nipsil LP [wet silica] (manufactured by Tosoh Silica Corporation)

B-2: R972 [dry silica] (manufactured by NIPPON AEROSIL CO., LTD.)

As average primary particle sizes of silica shown in Table 1, manufacturer catalog values are described.

[Dispersion Aid]

C-1: RIKEMAL PL012 [glycerin ester compound] (Riken Vitamin Co., Ltd.)

C-2: MONOSIZER W242 [adipic acid ester compound] (manufactured by DIC Corporation)

C-3: Polysorb ID46 [isosorbide ester compound] (manufactured by ROQUETTE)

[Aliphatic-Aromatic Polyester]

D-1: Ecoflex F Blend C1200 (manufactured by BASF SE): PBAT

D-2: Ecoflex FS Blend B1100 (manufactured by BASF SE): PBST

D-3: GF 106/02 (manufactured by Biotec Co., Ltd.): PBAT/starch=66/34

[Example 1] (Production of Aliphatic Polyester Resin Composition)

An aliphatic polyester A-1, silica B-1 and a dispersion aid C-1 were mixed at blending ratios as shown in Table 1 (the blending ratio in the table is shown in parts by weight; and the same applies hereinafter). First, as a first step of mixing before melting and kneading, the aliphatic polyester A-1 in an amount of 30% by weight based on the total amount of the aliphatic polyester A-1, and 10 parts by weight of the silica B-1 based on the total amount (100 parts by weight) of the aliphatic polyester A-1 were put in a super mixer, and mixed at 300 rpm for 1 minute. Next, as a second step, 20 parts by weight of the dispersion aid C-1 based on the total amount (100 parts by weight) of the aliphatic polyester A-1 was added to the mixture obtained in the first step, and the resultant was mixed for 5 minutes. Subsequently, as a third step, the aliphatic polyester A-1 remaining in an amount of 70% by weight based on the total amount of the aliphatic polyester A-1 was added to the mixture obtained in the second step, and the resultant was mixed at 300 rpm for 3 minutes to obtain a mixed raw material before melting and kneading.

Next, all of the mixed raw material was put in a co-direction intermeshing twin-screw extruder (TEM-26SS manufactured by TOSHIBA MACHINE CO., LTD.) at once from a first supply port (13) shown in FIG. 1, and melted and kneaded at a set temperature of 120 to 140° C. and a screw rotational speed of 100 rpm (outlet resin temperature: 155° C.) to obtain an aliphatic polyester resin composition. The outlet resin temperature was determined by directly measuring the melted resin coming out of a die by a K-type thermocouple. The aliphatic polyester resin composition was taken up in a strand form from the die, and cut into pellets.

(Production of Film)

Using a single screw extruder Labo Plastomill (model 20C 200 manufactured by Toyo Seiki Seisaku-sho, Ltd.) equipped with a T-shaped die with a width of 150 mm and a lip of 0.25 mm, the aliphatic polyester resin composition obtained as described above was extruded at a die set temperature of 160° C. and a screw rotational speed of 40 rpm, and taken up at a speed of 1 m/min with a cooling roll controlled to a temperature of 60° C. to obtain a film having a thickness of 40 mm.

(Evaluation of Silica Dispersibility [Appearance])

Ten areas of 10 cm (width)×30 cm (length) were randomly selected from the film obtained as described above. A sample was rated "good" when the number of fish eyes of 40 μm or more was confirmed to be 1 or less in each of all the 10 areas, and a sample was rated "poor" when the number of such fish eyes was confirmed to be 2 or more in one or more of the 10 areas. The evaluation results are shown in Table 1. The fish eye mentioned herein refers to a solid matter which is not melted even when heated to 250° C. with a temperature variable polarizing microscope, and a fish eye which is melted in the middle of heating to 250° C. and which no longer maintains a solid state is excluded. That is, the fish eye refers to a silica aggregate having a size of 40 μm or more.

(Adsorbed Moisture Content in Silica)

The volatile component content at 160° C. was measured using an electromagnetic balance MX-50 manufactured by Kensei Co., Ltd., and the measured value was recorded as a moisture content (adsorbed moisture content).

(Evaluation of Bleed-Out)

A sample of 10 cm (width)×100 cm (length) was cut out from the film obtained as described above. Using an oil-based color felt pen manufactured by ZEBRA CO., LTD., one line was drawn at the center, and two lines were drawn on both sides, respectively, at a distance of 4 cm from the center in the longitudinal direction. The sample was left standing at 23° C. and 50% RH for 6 months, and bleeding of the drawn line was examined every one week after molding. Bleeding was examined visually and by rubbing the sample with a finger. A sample was rated "good" when bleeding did not occur even after 6 months, and a sample was rated "poor" when bleeding occurred in 6 months. The evaluation results are shown in Table 1.

Examples 2 and 3

An aliphatic polyester resin composition and a film composed of the composition were obtained in the same manner as in Example 1, except that the blending amount of the aliphatic polyester A-1 used in the first step of mixing before melting and kneading and the third step of mixing before melting and kneading was changed as shown in Table 1, and the dispersibility of the silica and the bleed-out were evaluated using the film. The evaluation results are shown in Table 1.

Examples 4 to 7

An aliphatic polyester resin composition and a film composed of the composition were obtained in the same manner as in Example 1, except that the types of the aliphatic polyester (A), the silica (B) and the dispersion aid (C) used were changed as shown in Table 1, and the dispersibility of the silica and the bleed-out were evaluated using the film. The evaluation results are shown in Table 1.

Examples 8 and 9

An aliphatic polyester resin composition and a film composed of the composition were obtained in the same manner as in Example 1, except that the blending amounts of the silica (B) and the dispersion aid (C) used were changed as shown in Table 1 and the dispersibility of the silica and the bleed-out were evaluated using the film. The evaluation results are shown in Table 1.

Example 10

An aliphatic polyester resin composition and a film composed of the composition were obtained in the same manner as in Example 1, except that the blending amount of the aliphatic polyester A-1 used in the third step of mixing before melting and kneading was changed as shown in Table 1, the mixture obtained in the third step was put in from the first supply port (13) shown in FIG. 1, and the remaining aliphatic polyester A-1 was put in from a second supply port (14) shown in FIG. 1, and the dispersibility of the silica and the bleed-out were evaluated using the film. Here, the second supply port (14) was installed at a position of 62% from the upstream side where the total length of screw is 100%. The evaluation results are shown in Table 1.

TABLE 1

| | | | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| Blended components | (A) Aliphatic polyester | | 100 | 100 | 100 | 100 | 100 | 100 | 100 | 100 | 100 | 100 |
| | (B) Silica | | 10 | 10 | 10 | 10 | 10 | 10 | 10 | 5 | 20 | 10 |
| | (C) Dispersion aid | | 20 | 20 | 20 | 20 | 20 | 20 | 20 | 11 | 20 | 20 |
| | Aliphatic polyester | | A-1 | A-1 | A-1 | A-2 | A-1 | A-1 | A-1 | A-1 | A-1 | A-1 |
| | Silica | Grade | B-1 | B-1 | B-1 | B-1 | B-2 | B-1 | B-1 | B-1 | B-1 | B-1 |
| | | Average primary particle size (nm) | 16 | 16 | 16 | 16 | 16 | 16 | 16 | 16 | 16 | 16 |
| | | Moisture content (%) | 4 | 4 | 4 | 4 | 3 | 4 | 4 | 4 | 4 | 4 |
| | Dispersion aid | | C-1 | C-1 | C-1 | C-1 | C-1 | C-2 | C-3 | C-1 | C-1 | C-1 |
| Blending ratio | First step | (A) Aliphatic polyester | 30 | 20 | 50 | 30 | 30 | 30 | 30 | 30 | 30 | 30 |
| | | (B) Silica | 10 | 10 | 10 | 10 | 10 | 10 | 10 | 5 | 20 | 10 |
| | Second step | (C) Dispersion aid | 20 | 20 | 20 | 20 | 20 | 20 | 20 | 11 | 20 | 20 |
| | Third step | (A) Aliphatic polyester | 70 | 80 | 50 | 70 | 70 | 70 | 70 | 70 | 70 | 20 |
| Side feed supply | | (A) Aliphatic polyester | — | — | — | — | — | — | — | — | — | 50 |
| Silica dispersibility | | | "Good" | "Good" | "Good" | "Good" | "Good" | "Good" | "Good" | "Good" | "Good" | "Good" |
| Bleed-out | | | "Good" | "Good" | "Good" | "Good" | "Good" | "Good" | "Good" | "Good" | "Good" | "Good" |

Comparative Examples 1 and 2

An aliphatic polyester resin composition and a film composed of the composition were obtained in the same manner as in Example 1, except that the blending amount of the aliphatic polyester A-1 used in the first step of mixing before melting and kneading was changed as shown in Table 2, and the dispersibility of the silica and the bleed-out were evaluated using the film. The evaluation results are shown in Table 2.

Comparative Example 3

An aliphatic polyester resin composition and a film composed of the composition were obtained in the same manner as in Example 1, except that the blending amounts of the silica (B) and the dispersion aid (C) were changed as shown in Table 2, and the dispersibility of the silica and the bleed-out were evaluated. The evaluation results are shown in Table 2.

TABLE 2

|  |  |  | Example 11 | Comparative Example 1 | Comparative Example 2 | Comparative Example 3 |
|---|---|---|---|---|---|---|
| Blended components | (A) Aliphatic polyester | | 100 | 100 | 100 | 100 |
| | (B) Silica | | 10 | 10 | 10 | 25 |
| | (C) Dispersion aid | | 20 | 20 | 20 | 25 |
| | Aliphatic polyester | | A-1 | A-1 | A-1 | A-1 |
| | Silica | Grade | B-1 | B-1 | B-1 | B-1 |
| | | Average primary particle size (nm) | 16 | 16 | 16 | 16 |
| | | Moisture content (%) | 7 | 4 | 4 | 4 |
| | Dispersion aid | | C-1 | C-1 | C-1 | C-1 |
| Blending ratio | First step | (A) Aliphatic polyester | 30 | 15 | 55 | 30 |
| | | (B) Silica | 10 | 10 | 10 | 25 |
| | Second step | (C) Dispersion aid | 20 | 20 | 20 | 25 |
| | Third step | (A) Aliphatic polyester | 70 | 85 | 45 | 70 |
| Side feed supply | | (A) Aliphatic polyester | — | — | — | — |
| Silica dispersibility | | | "Good" | "Poor" | "Poor" | "Poor" |
| Bleed-out | | | "Good" | "Good" | "Good" | "Poor" |

Comparison of Examples 1 to 3 with Comparative Examples 1 and 2 shows that as in Comparative Examples 1 and 2, a problem arises in the dispersibility of the silica when the blending amount of the aliphatic polyester mixed in the first step is outside the proper range specified in the present invention. In addition, comparison of Example 1 with Comparative Example 3 shows that as in Comparative Example 3, a problem arises in the dispersibility of the silica and the bleed-out property when the silica and the dispersion aid in an amount outside the proper range specified in the present invention are blended. On the other hand, it is apparent that when a proper mixing method as shown in the present invention is carried out before melting and kneading, it is possible to produce a resin composition having favorable dispersibility even when various materials are used as shown in Examples 1 to 10.

Example 11

An aliphatic polyester resin composition and a film composed of the composition were obtained in the same manner as in Example 1, except that the moisture content of the silica (B) used was changed as shown in Table 2, and the dispersibility of the silica and the bleed-out were evaluated. The evaluation results are shown in Table 2.

Examples 12 to 14

An aliphatic polyester resin composition (Y-1) produced in Example 1 and the aliphatic-aromatic polyester D-1 were mixed (dry-blended) at a blending ratio shown in Table 3, and the resulting mixture was put in at once from the first supply port (13) shown in FIG. 1, and melted and kneaded at a set temperature of 140° C. (outlet resin temperature of 160° C.) and a screw rotational speed of 100 rpm to obtain an aliphatic polyester resin composition (this method is referred to as D-a). The aliphatic polyester resin composition was taken up in a strand form from the die, and cut into pellets.

Subsequently, from the resulting aliphatic polyester resin composition, a film having a thickness of 40 μm was prepared at a die setting temperature of 160° C. using the same molding machine as used in Example 1, and the dispersibility of the silica and the bleed-out were evaluated using the film. The evaluation results are shown in Table 3.

(Measurement of Tear Strength)

The tear strength of the resulting film (sheet) in the MD direction was measured in accordance with JIS 8116 using an Elmendorf tear strength measuring apparatus (manufactured by KUMAGAI RIKI KOGYO Co., Ltd.). The tear strength measurement results are shown in Table 3.

Examples 15 and 16

An aliphatic polyester resin composition and a film composed of the composition were obtained in the same manner as in Example 13, except that the type of the aliphatic-aromatic polyester (D) used was changed as shown in Table 3, and the dispersibility of the silica, the bleed-out and the tear strength were evaluated using the film. The evaluation results are shown in Table 3.

Example 17

An aliphatic polyester resin composition was obtained in the same manner as in Example 1, except that in the step of producing an aliphatic polyester resin composition by the method of Example 1 (melting and kneading step), the set temperature was 140° C. (outlet resin temperature 160° C.), and in addition to the mixed raw material containing the aliphatic polyester A-1, the silica B-1 and the dispersion aid C-1, the aliphatic-aromatic polyester D-1 was supplied at a blending ratio as shown in Table 3 from the first supply port (13) shown in FIG. 1 (this method is referred to as D-b). Subsequently, a film composed of the aliphatic polyester resin composition was obtained in the same manner as in Example 13, and the dispersibility of the silica, the bleed-out and the tear strength were evaluated using the film. The evaluation results are shown in Table 3.

Example 18

An aliphatic polyester resin composition was obtained in the same manner as in Example 1, except that in the step of producing an aliphatic polyester resin composition by the method of Example 1 (melting and kneading step), the set temperature was 140° C. (outlet resin temperature 160° C.), and not only the mixed raw material containing the aliphatic polyester A-1, the silica B-1 and the dispersion aid C-1 was put in from the first supply port shown in FIG. 1, but also the aliphatic-aromatic polyester D-1 was supplied at a blending ratio as shown in Table 3 from the second supply port (14) shown in FIG. 1 (this method is referred to as D-c). Here, the second supply port (14) was installed at a position of 62% from the upstream side where the total length of screw is 100%. Subsequently, a film composed of the aliphatic polyester resin composition was obtained in the same manner as in Example 13, and the dispersibility of the silica, the bleed-out and the tear strength were evaluated using the film. The evaluation results are shown in Table 3.

Comparative Example 4

An aliphatic polyester resin composition and a film composed of the composition were obtained in the same manner as in Example 13, except that an aliphatic polyester resin composition (Y-2) prepared in Comparative Example 1 was used, and the dispersibility of the silica, the bleed-out and the tear strength were evaluated using the film. The evaluation results are shown in Table 3.

REFERENCE SIGNS LIST 11 cylinder
12 screw
13 first supply port
14 second supply port (side feeder)
15 cylinder tip
16 strand hole
17 drive motor
18 dice

TABLE 3

| | | Example 12 | Example 13 | Example 14 | Example 15 | Example 16 | Example 17 | Example 18 | Comparative Example 4 |
|---|---|---|---|---|---|---|---|---|---|
| Blending ratio | Aliphatic polyester resin composition | Y-1 | Y-1 | Y-1 | Y-1 | Y-1 | — | — | Y-2 |
| | Blending amount | 36 | 46 | 57 | 46 | 46 | — | — | 46 |
| | First step (A) Aliphatic polyester | — | — | — | — | — | 30 | 30 | 15 |
| | (B) Silica | — | — | — | — | — | 10 | 10 | 10 |
| | Second step (C) Dispersion aid | — | — | — | — | — | 20 | 20 | 20 |
| | Third step (A) Aliphatic polyester | — | — | — | — | — | 70 | 70 | 85 |
| | Aliphatic-aromatic polyester | D-1 | D-1 | D-1 | D-2 | D-3 | D-1 | D-1 | D-1 |
| | Blending amount | 64 | 54 | 43 | 54 | 54 | 150 | 150 | 54 |
| Method for compounding other resin (D) | | D-a | D-a | D-a | D-a | D-a | D-b | D-c | D-a |
| Aliphatic polyester/aliphatic-aromatic polyester ratio | | 30/70 | 40/60 | 50/50 | 40/60 | 40/60 | 40/60 | 40/60 | 40/60 |
| Silica dispersibility | | "Good" | "Good" | "Good" | "Good" | "Good" | "Good" | "Good" | "Poor" |
| Bleed-out | | "Good" | "Good" | "Good" | "Good" | "Good" | "Good" | "Good" | "Good" |
| Tear strength (N/mm) | | 32 | 43 | 41 | 40 | 130 | 56 | 42 | 22 |

Composition Y-1: resin composition prepared in Example 1
Composition Y-2: resin composition prepared in Comparative Example 1

Comparison of Example 13 with Comparative Example 4 shows that when the aliphatic polyester resin composition having favorable dispersibility of the silica is additionally melted and kneaded to be compounded with the aliphatic-aromatic polyester (D) as in Example 13, a film having favorable dispersibility of the silica and having a sufficiently high tear strength of 30 N/mm or more is obtained. As is apparent from Examples 12 to 16, use of the aliphatic polyester resin composition produced by the production method of the present invention, e.g., the aliphatic polyester resin composition in Example 1 makes it possible to obtain a film having favorable dispersibility of the silica and having sufficiently high tear strength even when the composition is compounded with various kinds of the aliphatic-aromatic polyester (D) or the blending amount of the aliphatic-aromatic polyester (D) is changed. In addition, in Examples 17 and 18, favorable silica dispersibility and tear strength are exhibited, and therefore in the production method of the present invention, a method for compounding the aliphatic-aromatic polyester (D) can be selected from various methods.

The invention claimed is:

1. A method for producing an aliphatic polyester resin composition comprising 100 parts by weight of an aliphatic polyester (A), 5 to 23 parts by weight of silica (B) and 8 to 23 parts by weight of a dispersion aid (C), the method comprising:
mixing the aliphatic polyester (A) in an amount of 20 to 50% by weight based on a total amount of the aliphatic polyester (A) constituting the composition, and the silica (B), to obtain a first mixture;
mixing the dispersion aid (C) with the first mixture to obtain a second mixture;
mixing the second mixture with the remaining aliphatic polyester (A) constituting the composition to obtain a third mixture; and
melting and kneading the third mixture.

2. A method for producing an aliphatic polyester resin composition comprising 100 parts by weight of an aliphatic polyester (A), 5 to 23 parts by weight of silica (B) and 8 to 23 parts by weight of a dispersion aid (C), the method comprising:
mixing the aliphatic polyester (A) in an amount of 20 to 50% by weight based on a total amount of the aliphatic polyester (A) constituting the composition, and the silica (B), to obtain a first mixture;
mixing the dispersion aid (C) with the first mixture to obtain a second mixture;
mixing the second mixture with a part of the remaining aliphatic polyester (A) constituting the composition to obtain a third mixture; and
melting and kneading the third mixture while sequentially adding a remaining part of the remaining aliphatic polyester (A).

3. The method according to claim 1, further comprising:
mixing an aliphatic-aromatic polyester (D) after the mixing step to obtain the third mixture.

4. The method according to claim 3, wherein the mixing of the aliphatic-aromatic polyester (D) is performed by melting and kneading.

5. The method according to claim 4, wherein the mixing of the aliphatic-aromatic polyester (D) is performed after the melting and kneading of the third mixture.

6. The method according to claim 1, wherein the silica (B) contains an adsorbed moisture that is volatilized at 160° C. in an amount of 0.5% by weight or more and 7% by weight or less.

7. The method according to claim 1, wherein the dispersion aid (C) is at least one selected from the group consisting of a glycerin ester compound, an adipic acid ester compound, a polyether ester compound and an isosorbide ester compound.

8. The method according to claim 1, wherein the aliphatic polyester resin composition is suitable for a molded article.

9. The method according to claim 8, further comprising:
molding the melted and kneaded third mixture to form the molded article.

10. The method according to claim 1, wherein the aliphatic polyester (A) is at least one of a polyhydroxyalkanoate (PHA) and a polylactic acid (PLA).

11. The method according to claim 1, wherein the aliphatic polyester (A) has a molecular weight of from 50,000 to 3,000,000.

12. The method according to claim 1, wherein the aliphatic polyester (A) has an average particle size of from 100 μm to 700 μm.

13. The method according to claim 1, wherein the silica (B) has an average primary particle size of from 0.001 μm to 0.1 μm.

14. The method according to claim 1, wherein each of the mixing processes to obtain the first, second, and third mixtures is performed at a temperature lower than a temperature at which the aliphatic polyester (A) is melted.

15. The method according to claim 1, wherein the first and second mixtures are not melted and kneaded.

16. The method according to claim 1, wherein in the mixing process to obtain the first mixture, 100% by weight of the silica (B) based on a total amount of the silica (B) constituting the composition is mixed with the aliphatic polyester (A).

17. The method according to claim 1, wherein in the mixing process to obtain the second mixture, 100% by weight of the dispersion aid (C) based on a total amount of the dispersion aid (C) constituting the composition is mixed with the first mixture.

18. The method according to claim 1,
wherein the first and second mixtures are not melted and kneaded,
in the mixing process to obtain the first mixture, 100% by weight of the silica (B) based on a total amount of the silica (B) constituting the composition is mixed with the aliphatic polyester (A), and
in the mixing process to obtain the second mixture, 100% by weight of the dispersion aid (C) based on a total amount of the dispersion aid (C) constituting the composition is mixed with the first mixture.

* * * * *